3,236,885
PROCESS FOR PURIFYING PYROMELLITIC ACID
Eugene Ryon Gray, Pitman, N.J., assignor to E. I. du Pont de Nemours and Company, Wilmington, Del., a corporation of Delaware
No Drawing. Filed Nov. 29, 1961, Ser. No. 155,805
6 Claims. (Cl. 260—525)

The present invention relates to a process for the purification of pyromellitic acid, hereinafter called PMA, and more particularly to a process for removing color forming impurities, chiefly nitro compounds, from PMA.

PMA is a promising compound for many attractive uses in industry. In the form of its anhydride it is the best curing agent known for epoxy resins to give products having extremely high thermal stability. The anhydride or the acid is used to make linear polyesters and polyamides having very high softening points which may be substituted for some metals in high temperature applications. The anhydride is also used as a curing agent for epoxy plasticizers for polyvinyl chloride to give plasticized resins of essentially 100% solids content. The precured mixture is a liquid and, after curing, forms a resin having no volatile plasticizers so that good strength and flexibility are maintained for long periods of time in use.

PMA is generally prepared by the oxidation of alkyl-substituted aromatic hydrocarbons, chiefly durene. 2,4,5-trimethylbenzaldehyde, 1 - chloromethyl-2,4,5-trimethylbenzene, and 1 - hydroxymethyl-2,4,5-trimethylbenzene can also be oxidized to PMA. The best oxidizing agent for making PMA from the standpoint of both economy and effectiveness is nitric acid. When nitric acid is used as an oxidizing agent, however, small quantities of aromatic and aliphatic nitro compounds are formed as impurities. These impurities are very difficult to remove and, in subsequent use of the PMA, give products having an unacceptable degree of color, in some cases a dark brown. These nitro compounds usually amount to as much as 2% by weight of the crude PMA. In order to have a product satisfactory for the preparation of light-colored compositions, the concentration of nitro compounds must be lowered to no more than 150 parts per million.

As used herein, the expressions "crude PMA" and "crude pyromellitic acid" denote PMA prepared by the nitric acid oxidation of an alkyl-substituted aromatic hydrocarbon, 2,4,5-trimethylbenzaldehyde, 1-chloromethyl-2,4,5 - trimethylbenzene or 1 - hydroxymethyl-2,4,5-trimethylbenzene.

Various expedients have been evaluated for the removal of the undesired nitro compounds from the PMA, including char treatment, recrystallization from various solvents, and the like. Because of the solubility of PMA in water, 3.5 and 20 pounds of PMA per 100 pounds of water at 20° and 90° C., respectively, char treatment in aqueous solution appears especially attractive. Unfortunately, however, when a hot (90° C.) aqueous solution of PMA containing about 1–2% by weight of nitrocompound impurity is slurried with activated carbon, the recrystallized PMA has a residual nitro compound content of about 0.5%; considerably in excess of the tolerable limits.

It has been discovered that the effectiveness of char in removing the undesirable nitro compounds is tremendously enhanced when the contact of the char with the aqueous PMA is made at a temperature of at least 200° C.; however, in order to provide a workable process for the removal of such impurities, sufficient pressure must be used to maintain the solvent, i.e., the water, in a liquid phase. Accordingly, the process of this invention for the purification of PMA comprises contacting an aqueous solution of PMA with activated carbon at a temperature of at least 200° C. and a pressure sufficient to maintain a liquid phase, separating the carbon from the aqueous solution, and recovering the purified PMA from the water.

While we do not wish to be bound by theory we believe that the improved adsorptive powers of the carbon for nitro compounds at temperatures above 200° C. is caused by thermal expansion of the interstices in the carbon to physically allow penetration and absorption of the bulky nitro compounds.

The temperature at which the char treatment can be carried out is from 200° C. to 374° C. Above 374° C. water cannot exist as a liquid no matter how high the pressure. The preferred range for the char treatment is 240–280° C.

As the char, activated carbon is preferred. Activated carbon is a high-surface-area material made by carbonizing coal, wood, peat, cellulose waste, bones, coconut shells, or core cobs. The carbonized material is generally given a steam or carbon dioxide treatment to increase activity. The surface area ranges from $2 \times 10^4$ to $6 \times 10^4$ sq. cm. per gram. Type SGL granular carbon manufactured by the Pittsburgh Coke and Chemical Company is suitable for column operation and Type RB pulverized carbon from the same company was suitable for batch operation. The amount of char required is dependent upon the amount of impurity present; generally as little as 1 part by weight of char per 100 parts of PMA may be used. However, char is not deleterious, and as much as 1 part by weight of char per part of PMA may be used, particularly in a continuous process where the aqueous solution of PMA is passed through a char bed.

The charcoal treatment of the crude PMA can be done in the presence of reducing agents such as hydrogen, hydrogen sulfide, sodium sulfide, sodium sulfite, sodium hyposulfite, sodium thiosulfate and sodium bisulfite. The latter two are particularly effective. These reducing agents lower the concentration of nitro compounds in the PMA by reducing them to amines, more strongly adsorbed on the char than the parent nitro compound. The quantity of reducing agent used should be from 0.05 to 5% by weight of the PMA used. Less than 0.05% reducing agent is not sufficiently effective and more than 5% is wasteful. When the purification is done in the presence of these reducing agents the carbon: PMA ratio can be lower than in their absence, as low as about 0.005.

The concentrations of the aqueous PMA solutions used in the practice of this invention can vary from about 5% to about 50%. Below 5% the solubility of the PMA would be sufficiently high at the freezing point of water so that little solid PMA would crystallize from the solution on cooling to 0° C. Above 50% the solutions would become very difficult to handle and purification would not be as efficient because of the lower quantity of solvent used.

After the char treatment at 200–374° C. the solution is cooled to a temperature of about 0–50° C. in order to recrystallize the PMA. Temperatures below about 0° C. are not suitable because of incipient freezing of the solution and temperatures above about 50° C. leave too great a quantity of dissolved PMA in the filtrate. This latter limit is not imposed because of lack of operability above about 50° C. but because of the economic penalty imposed by excessive recycling of PMA and, therefore, lower space-time yields. Obviously, the concentration of the starting PMA solution must be higher than the solubility of PMA at the crystallizing temperature or no solid PMA will separate on cooling.

The char can be separated from the slurry before crystallization at any temperature at which all of the PMA present remains in solution.

The purification of the PMA can be carried out either batchwise or in a continuous system. In a batch process the charcoal is mixed with an aqueous solution of PMA, the mixture is heated to at least 200° C., the carbon is filtered off at a temperature above that at which recrystallization of PMA occurs, the solution is cooled to 0° to 50° C. and the recrystallized pure PMA is separated from the aqueous slurry. In a continuous process the aqueous solution of PMA, heated to at least 200° C., is passed slowly through a bed of activated charcoal maintained at at least 200° C. The effluent is cooled to about 0° to 50° C. and the recrystallized PMA filtered from the aqueous slurry. The liquid from the filtration, which contains some PMA in solution, can be used for making up a more concentrated solution of crude PMA for recycle through the carbon bed.

The following examples illustrate several modes of carrying out the invention. Many other modifications will be obvious to those skilled in the art. In all cases the parts or percents given are by weight unless otherwise specified.

*Example 1*

A crude PMA made by nitric acid oxidation of durene and containing about 1.2% of reducible material (the reducible content is measured by a polarographic method in which the sum of the materials having half-wave potentials at −0.50, −0.75 and −1.20 volts is taken and expressed as nitrobenzoic acid. The exact composition of the color-forming reducible impurities is unknown, but infrared studies of the isolated impurities indicate that they are chiefly nitro compounds. Calculating them as nitrobenzoic acid is merely a convenient method of getting a comparable figure for different samples) is dissolved in water to make a 15% solution of PMA. An activated charcoal, Norit SG III, manufactured by American Norit Co., having a minimum iodine number of 900, minimum molasses number of 200 and a maximum ash content of 8% is added in an amount equivalent to 10% of the weight of the PMA and the mixture is heated to 270° C. in a pressure vessel with agitation for 20 minutes. The pressure within the vessel rose to 800–900 pounds per square inch. The charcoal is then filtered from the solution while being removed hot from the pressure vessel and the clear solution of PMA in water allowed to cool to 20° C. The white purified PMA is filtered off, washed with one displacement of water, and dried at 100° C. to remove water. Essentially no reducibles are found in the product by polarographic analysis.

*Examples 2 and 3*

The procedure of Example 1 is repeated to give the following results:

| Example No. | Reducibles in starting material (percent) | Reducibles in product (parts per million) |
| --- | --- | --- |
| 2 | 1.8 | Nil |
| 3 | 2.0 | 12 |

*Example 4*

The procedure of Example 1 is repeated using PMA containing 1.2% reducible material except that the temperature used was 200° C., the PMA: water ratio was 0.25 and the PMA-charcoal ratio was 1. The reducible content of the product is nil.

*Example 5*

A 1-inch diameter stainless steel column 30 inches long is prepared containing a bed of granular carbon (8 mesh) made by the Pittsburgh Coke and Chemical Co. and sold under the name of Pittsburgh SGL. This carbon has a minimum iodine number of 900, minimum molasses number of 200 and a maximum ash content of 8%. The column is heated to 270° C. and a 15% solution of PMA (the PMA contained 4500 parts per million of reducible compounds) in water, heated to 270° C., is passed through the carbon bed at a rate of 5400 parts per hour. The ratio of carbon to PMA is 0.2. The pressure within the column is 800–900 pounds per square inch. The aqueous effluent from the column is cooled to 20° C. The white solid which precipitates is filtered off and dried at 100° C. Analysis showed that it contains only 5 parts per million of color-forming reducible compounds. The quantity of PMA recovered amounts to about 90% of the PMA charged. The used carbon is prepared for reuse by calcining for 10 minutes at 900° C. The filtrate after removal of the crystallized PMA, containing about 3.5% of PMA, is used for preparing a new charge of feed solution by adding the correct quantity of crude PMA.

*Example 6*

The procedure of Example 1 using PMA having 1.2% color-forming impurities is repeated except that 2% of sodium bisulfite (based on the weight of the PMA) is included in the slurry and the quantity of char is reduced to 5% of the weight of the PMA. The recrystallized product contains 2 parts per million of reducible color-forming impurities.

Many modifications will be apparent to those skilled in the art from a reading of the above description without departure from the inventive concept.

I claim:

1. A process for removing reducible, color-forming nitro compound impurities from crude pyromellitic acid which comprises contacting an aqueous solution of said acid at a concentration of about from 5 to 50% by weight, with activated carbon at a temperature of from 200° C. to 374° C. under a pressure sufficient to maintain the water in liquid phase, separating the resulting aqueous solution from said carbon, cooling the aqueous solution thus obtained to crystallize pure pyromellitic acid containing no more than 150 parts per million of said impurities, and separating said pure pyromellitic acid from the remaining liquid.

2. A process of claim 1 wherein the temperature is from 240 to 280° C.

3. A process of claim 1 wherein the crude pyromellitic acid is prepared by the nitric acid oxidation of durene and contains about from 1 to 2%, by weight, of reducible, color-forming nitro compound impurities.

4. A process according to claim 1, wherein said aqueous solution of crude acid contains a reducing agent selected from the group consisting of sodium thiosulfate and sodium bisulfite in the amount of 0.05 to 5% by weight based on the weight of said pyromellitic acid.

5. A process for removing reducible, color-forming nitro compound impurities from crude pyromellitic acid prepared by the nitric acid oxidation of an alkyl-substituted aromatic hydrocarbon which comprises passing an aqueous solution of said acid at a concentration of about from 5 to 50% by weight through a fixed bed of activated carbon maintained at a temperature of 200° C. to 374° C. and under a pressure sufficient to maintain the water in liquid phase, cooling the effluent from said bed to about from 0 to 50° C. to crystallize pure pyromellitic acid containing no more than 150 parts per million of said impurities, and separating the pure pyromellitic acid thus obtained from the remaining liquid.

6. A process of claim 5 wherein said crude pyromellitic acid is prepared by the nitric acid oxidation of durene.

References Cited by the Examiner

UNITED STATES PATENTS

| | | | |
|---|---|---|---|
| 2,154,626 | 4/1939 | Koch | 260—525 |
| 2,425,535 | 8/1947 | Hibschman et al. | 260—676 |
| 2,726,262 | 12/1955 | Grosskinsky et al. | 260—525 |
| 3,005,826 | 10/1961 | Fleck et al. | 260—676 X |

FOREIGN PATENTS

| | | |
|---|---|---|
| 1,052,393 | 3/1959 | Germany. |
| 695,170 | 8/1958 | Great Britain. |
| 785,045 | 10/1957 | Great Britain. |

OTHER REFERENCES

Journal of Physical and Colloid Chemistry 55, 1456 (1951), entitled Thermodynamics of Absorption from Solution. IV. Temperature Dependence of Absorption.

LORRAINE A. WEINBERGER, *Primary Examiner.*

LEON ZITVER, *Examiner.*